United States Patent
Shaffer et al.

(10) Patent No.: US 7,088,814 B1
(45) Date of Patent: Aug. 8, 2006

(54) METHOD AND SYSTEM FOR AUTOMATIC CALL DISTRIBUTION BASED ON NETWORK RESOURCE AVAILABILITY AND AGENT SKILLS

(75) Inventors: Shmuel Shaffer, Palo Alto, CA (US); Labhesh Patel, Mountain View, CA (US); Shantanu Sarkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 948 days.

(21) Appl. No.: 10/016,862

(22) Filed: Dec. 13, 2001

(51) Int. Cl.
 *H04M 3/00* (2006.01)

(52) U.S. Cl. ............................ 379/265.12; 379/265.01; 379/265.02; 379/265.11

(58) Field of Classification Search ........... 379/265.01, 379/265.02, 265.11, 265.12, 266.09, 266.04
See application file for complete search history.

(56) References Cited

U.S. PATENT DOCUMENTS

| | | | | |
|---|---|---|---|---|
| 5,825,869 A | * | 10/1998 | Brooks et al. | 379/256.12 |
| 6,088,441 A | * | 7/2000 | Flockhart et al. | 379/265.12 |
| 6,665,537 B1 | | 12/2003 | Lioy | 455/435 |
| 6,728,358 B1 | * | 4/2004 | Kwan | 379/202.01 |
| 6,763,104 B1 | * | 7/2004 | Judkins et al. | 379/265.09 |
| 6,879,586 B1 | * | 4/2005 | Miloslavsky et al. | 370/356 |

* cited by examiner

*Primary Examiner*—Rasha S. Al-Aubaidi
(74) *Attorney, Agent, or Firm*—Baker Botts L.L.P.

(57) ABSTRACT

A method for handling calls of an automatic call distributor system includes receiving, from a user, a request for connection with one of a plurality of agents, having one of a plurality of skills. In a particular embodiment, a preferred agent of the plurality of agents is selected by a statistical analysis using variables including a network resource available along a communication path between the user and the preferred agent, and an impact of connecting the user with the preferred agent upon the availability of a generally unique skill of the plurality of skills, to a future user. The user is connected with the preferred agent, the preferred agent having the one of the plurality of skills.

41 Claims, 2 Drawing Sheets

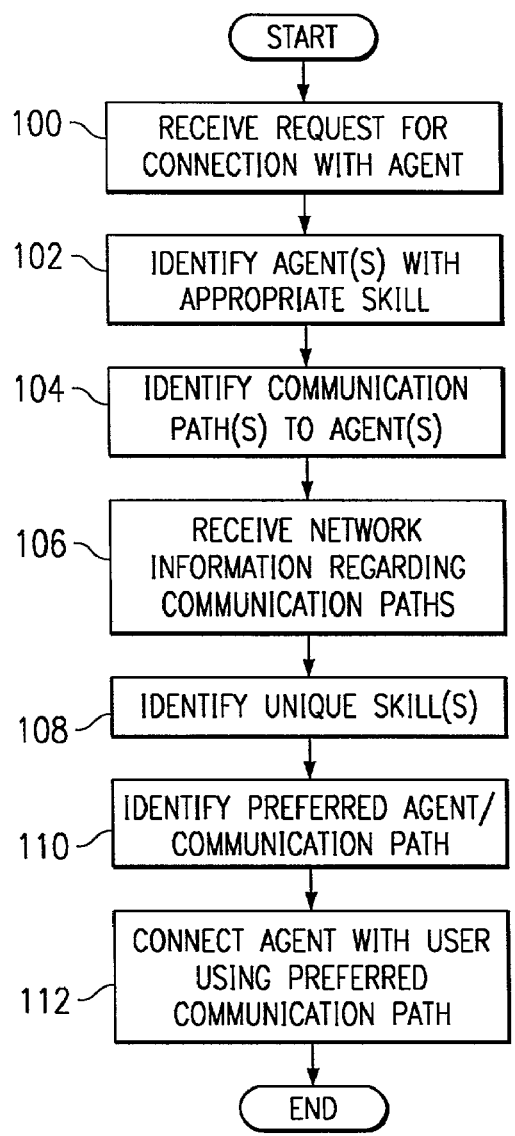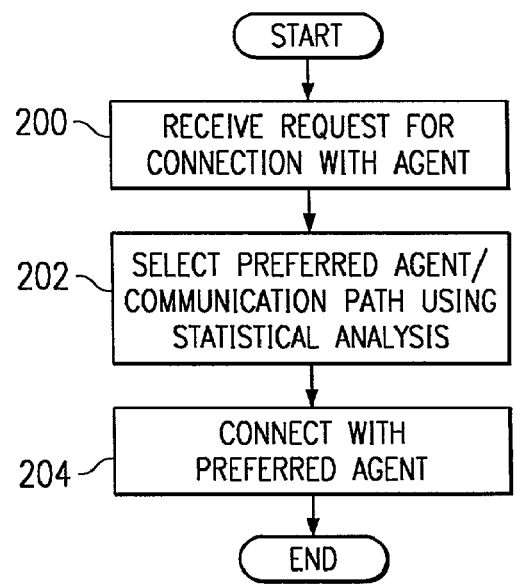

METHOD AND SYSTEM FOR AUTOMATIC CALL DISTRIBUTION BASED ON NETWORK RESOURCE AVAILABILITY AND AGENT SKILLS

TECHNICAL FIELD OF THE INVENTION

The present invention relates generally to automated network communication distribution and more particularly, to a method and system for automatic call distribution based on network resource availability and agent skill(s).

BACKGROUND OF THE INVENTION

Automatic call distributors (ACDs) are specialized phone systems designed to route incoming calls to available personnel, or agents so that calls are properly and evenly distributed. Increasingly, companies are using ACDs to make outgoing calls. ACDs generally perform one or more of the following functions: (i) recognize and answer incoming calls; (ii) review database(s) for instructions on what to do with a particular call; (iii) using these instructions, identify an appropriate agent and queue the call, often times providing a prerecorded message; and (iv) route the call to an agent as soon as the agent is available.

The term automatic call distributor comes from distributing the incoming calls in a logical pattern to a group of agents. That pattern may be uniform (to distribute the work uniformly), or it may be top-down (the same agents in the same order get the calls and are kept busy, the ones on the top typically being kept busier than the ones on the bottom), or it may be specialty routing, where calls are routed to agents who are most likely able to help the caller the most.

Skill-based routing (AKA resume routing) is an ACD feature that provides for the selection of an appropriate agent for handling a particular call. With this feature, agents are registered with their skills set as resources for handling calls. Examples for different skill sets are languages (English, French, Spanish, etc.) or business types (home insurance, life insurance, car insurance, etc.). The caller indicates the skill that she requires for a particular transaction, and the system either finds the appropriate resource or queues the caller until the resource with the requested skill becomes available.

Many large enterprises employ distributed call centers. For example, a company may have call centers in New York, Atlanta, and San Francisco. Each call center mainly handles local calls, however it may also handle overflow calls from other call centers. Central offices may provide the signaling for handling the call distribution as part of a 1-800 service. Such distributed call centers often employ voice over Internet Protocol (VoIP) and utilize a wide area network (WAN) to reduce operation costs. While the local area network (LAN) is provisioned to handle local calls, the WAN bandwidth is usually limited, and thus it can transport only a limited number of calls to each particular overflow call center.

SUMMARY OF THE INVENTION

The present invention solves many of the problems and disadvantages associated with prior automatic call distributor systems and methods. In a particular embodiment, the present invention provides a system and method that increases the probability that overall resources of the ACD call center (agents with specific skill sets and network resources) are optimally utilized. This helps insure that access to agents having a generally unique skill will remain available to future callers.

In a particular embodiment, a method for routing calls of an automatic call distributor system includes receiving, from a user, a request for a connection with one of a plurality of agents, having one of a plurality of skills. The user may be connected with a preferred agent of the plurality of agents, the preferred agent having the one of the plurality of skills. In particular, the preferred agent may be selected by a statistical analysis using variables including a network resource available along a communication path between the user and the preferred agent, and an impact of connecting the user with the preferred agent upon the availability of a generally unique skill of the plurality of skills, to a future user.

In another embodiment, an automatic call distributor system includes at least one input port operable to receive, from a user, a request for a connection with one of a plurality of agents having one of a plurality of skills. The system includes a processor operable to identify at least first and second agents of the plurality of agents, having at least the one of the plurality of skills. The first and second agents are generally available to receive the request for a connection along first and second communication paths, respectively. The processor is further operable to receive network information regarding each of the first and second communication paths, and identify a generally unique skill of the plurality of skills. In particular, the processor may be operable to select a preferred communication path of the first and second communication paths, the preferred communication path being selected to attain a higher probability that the generally unique skill will remain available for receiving a future request for connection.

Technical advantages of particular embodiments of the present invention include a system and method that evaluates the availability of network resources along the path to various agents, as well as the particular skill sets of such agents. Accordingly, a communication path may be selected such that the probability that an agent having a unique skill will remain available to future callers with respect to other, non-selected communication paths.

Another technical advantage of a particular embodiment of the present invention includes a system and method which generally maintains the availability of agents with unique skills to handle calls with special needs, and also maintains the availability of communication paths to such agents. This decreases the overall waiting time for users seeking access to an agent with the generally unique skill. Furthermore, this minimizes situations wherein agents having the generally unique skill are available to handle calls, however calls cannot be routed to such agents because network resources required to establish the connection are not available.

Yet another technical advantage of the present invention includes a system and method which provides preferential transfer of calls to agents that can handle specific requests with better voice quality, thus improving customer satisfaction.

Still another technical advantage of particular embodiments of the present invention includes a system and method which allows better utilization of distributed ACD agents and network resources, and thus provides better call handling than traditional ACD systems. Furthermore, the teachings of the present invention apply equally to ACD call centers that handle both incoming and outgoing calls.

Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following descriptions, taken in conjunction with the accompanying drawings, in which:

FIG. 3 illustrates a method for automatic call distribution, in accordance with another embodiment of the present invention; and FIG. 4 illustrates a method for handling calls directed to an ACD, in accordance with still another embodiment of the present invention.

DETAILED DESCRIPTION OF THE INVENTION

Figure 1:
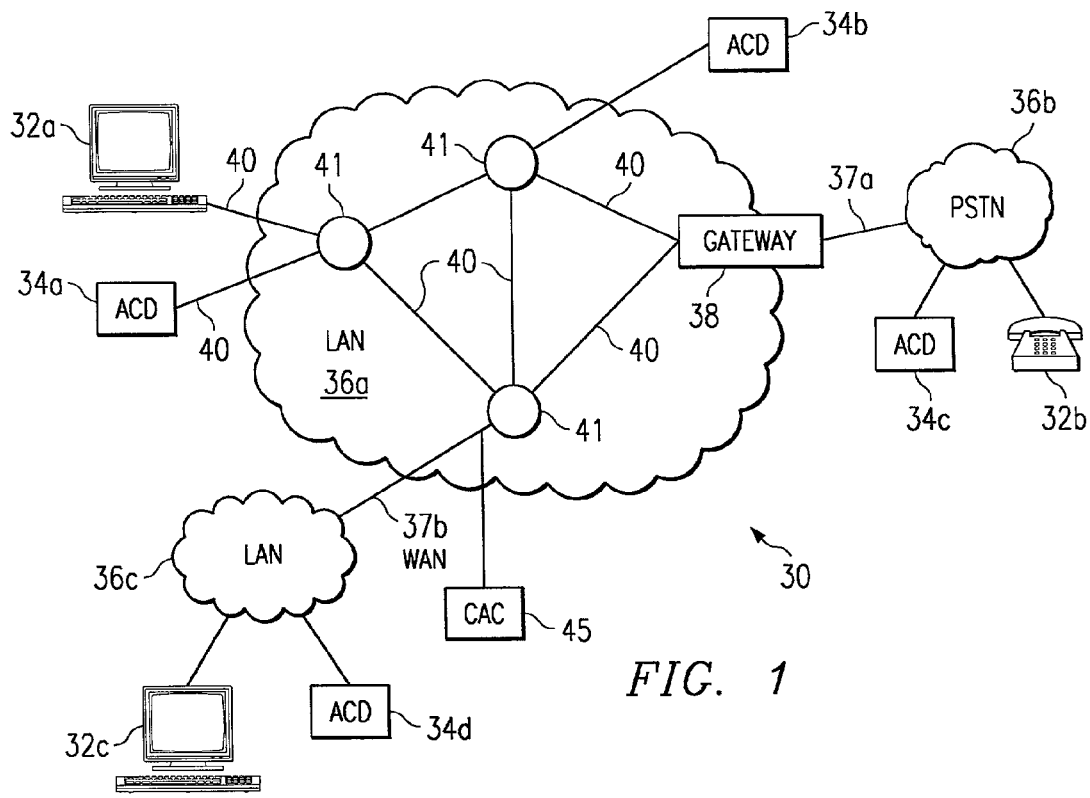
FIG. 1 illustrates a communication system including a plurality of endpoints operable to communicate among each other and a plurality of automatic call distributors (ACDs), in accordance with a particular embodiment of the present invention.

FIG. 1 illustrates a communication system 30 including a plurality of endpoints 32a–32c having the ability to establish communication sessions between each other and/or automatic call distributors (ACDs) 34a–34d, using one or more of communication networks 36a–36c. ACDs are specialized phone systems designed to route incoming calls to available agents, so that calls are properly and/or evenly distributed. For the purposes of this specification, "ACD" shall refer to any combination of hardware, software and/or embedded logic which is operable to automatically distribute incoming calls.

In the illustrated embodiment, incoming calls are routed to an ACD which is generally local to the endpoint initiating the call. However, calls to a particular ACD may be re-routed if the ACD is experiencing high traffic, malfunctioning, or an agent having a particular skill is not available to receive the call. The teachings of the present invention provide a system and method for distributing such calls to an appropriate ACD, based upon the availability of agents and their particular skill sets, and the availability of network resources required to communicate with such agents. This increases the overall probability that an agent(s) having a generally unique skill (as defined herein) will be available to receive potential future calls requesting such skill(s).

In the illustrated embodiment, communication network 36a is a local area network (LAN) that enables communication between a plurality of endpoints 32a–32c and ACDs 34a–34d distributed across multiple cities and geographic regions. In another embodiment, a single, central ACD may be used, which distributes incoming calls to agents distributed across multiple cities and geographic regions. Communication network 32b is the public switched telephone network (PSTN) and couples endpoint 32b and ACD 34c with communication network 36a through gateway 38. Communication network 36c is another LAN, which couples endpoint 32c and ACD 34d with communication network 36a. Accordingly, users of endpoints 32a–32c and ACDs 34a–34d can establish communication sessions between and among each network component coupled for communication with one or more of networks 36a–36c.

Communication links 37a and 37b couple communication networks 36a and 36b, and communication networks 36a and 36c, respectively. In the illustrated embodiment, communication link 37b is a wide area network (WAN), which couples LANs 36a and 36c. A call admission control (CAC) system 45 may be used to monitor the amount of bandwidth available over WAN 37b.

Communication network 36a includes a plurality of segments 40 and nodes 41 that couple endpoint 32a with ACDs 34a and 34b, gateway 38, and communication networks 36b–36c. Therefore, a user of endpoint 32a is provided with access to endpoints 32b and 32c, and ACDs 34a–34d. Nodes 41 may include any combination of network components, gatekeepers, call managers, routers, hubs, switches, gateways, endpoints, or other hardware, software, or embedded logic implementing any number of communication protocols that allow for the exchange of packets in communication system 30. Each segment 40 and the respective nodes 41 which couple segments 40, or other communication devices that couple segments and/or node include a finite capacity of network resources (e.g., bandwidth) available to a communication session between nodes, endpoints or ACDs. At any given time, a portion of such network resources may be dedicated to one or more existing communication sessions and less than the entire capacity of network resources may be available for a particular communication session.

Although the illustrated embodiment includes three communication networks 36a–36c, the term "communication network" should be interpreted as generally defining any network capable of transmitting audio and/or video telecommunication signals, data, and/or messages. Any one of networks 36a–36c may be implemented as a local area network (LAN), wide area network (WAN), global distributed network such as the Internet, Intranet, Extranet, or any other form of wireless or wireline communication network. Generally, network 36a provides for the communication of packets, cells, frames, or other portions of information (generally referred to as packets) between endpoints 32a–32c. Communication network 36a may include any number and combination of segments 40, nodes 41, endpoints 32a–32c, and/or ACDs 34a–34d.

In a particular embodiment, communication network 36a employs voice communication protocols that allow for the addressing or identification of endpoints, nodes, and/or ACDs coupled to communication network 36a. For example, using Internet protocol (IP), each of the components coupled together by communication network 36a in communication system 30 may be identified in information directed using IP addresses. In this manner, network 40 may support any form and/or combination of point-to-point, multicast, unicast, or other techniques for exchanging media packets among components in communication system 30. Although the subsequent description will primarily focus on IP telephony devices, it should be understood that any network component capable of exchanging audio, video, or other data using frames or packets, are also included within the scope of the present invention.

Network 36a may be directly coupled to other IP networks including, but not limited to, another LAN, or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38. In the illustrated embodiment, communication network 36a is coupled with PSTN 36b through gateway 38. PSTN 36b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 36b) dedicated circuit is not required for the duration of a call or fax transmission over IP networks.

The technology that allows telecommunications to be transmitted over an IP network may be referred to as Voice over IP (VoIP), or simply Voice over Packet (VoP). In the illustrated embodiment, endpoint 32a, ACDs 34a–34b, and gateway 38 are IP telephony devices. IP telephony devices have the ability of encapsulating a user's voice (or other input) into IP packets so that the voice can be transmitted over network 36a. IP telephony devices may include telephones, fax machines, computers running telephony software, nodes, gateways, or any other device capable of performing telephony functions over an IP network.

It will be recognized by those of ordinary skill in the art that endpoints 32a–32c, ACDs 34a–34d, and/or gateway 38 may be any combination of hardware, software, and/or encoded logic that provides communication services to a user. For example, endpoints 32a–32c may include a telephone, a computer running telephony software, a video monitor, a camera, or any other communication hardware, software, and/or encoded logic that supports the communication of packets of media (or frames) using communication network 36a. Endpoints 32a–32c may also include unattended or automated systems, gateways, other intermediate components, or other devices that can establish media sessions. Although FIG. 1 illustrates a particular number and configuration of endpoints, ACDs, segments, nodes, and gateways, communication system 30 contemplates any number or arrangement of such components for communicating media.

Figure 2:
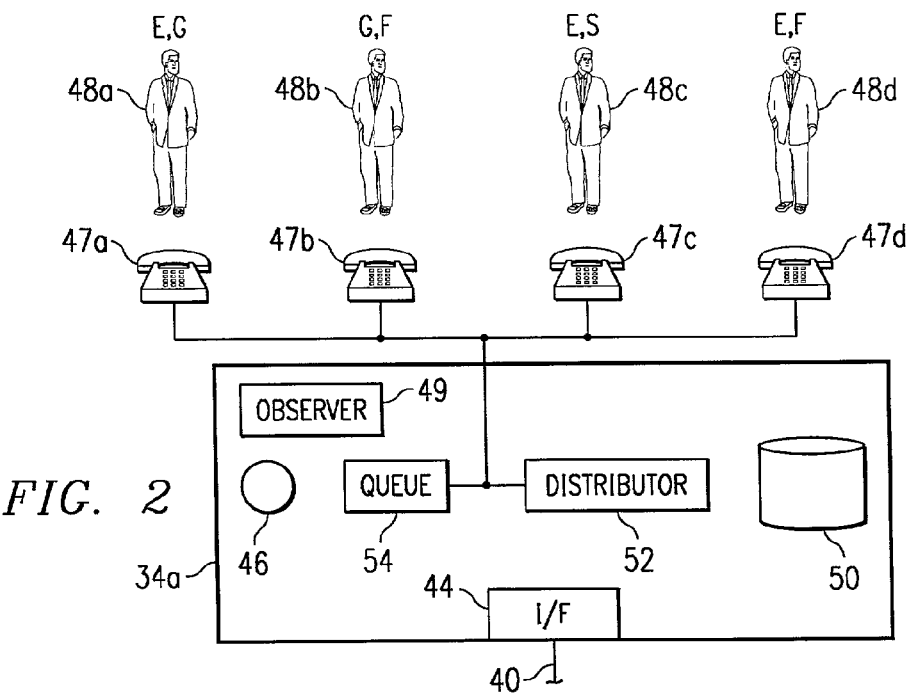
FIG. 2 illustrates an ACD of FIG. 1 in more detail, illustrating aspects of the present invention.

FIG. 2 illustrates ACD 34a in more detail, in accordance with a particular embodiment of the present invention. ACD 34a includes a network interface 44 which couples ACD 34a with communication network 36a, using segment 40. When a call is received at ACD 34a, a processor 46 and observer 49 are used to determine which of a plurality of agents 48a–48d should receive the call using endpoints 47a–47d, respectively. In doing so, processor 46 may use observer 49, a memory lookup, a database, or other memory module, such as memory module 50. Processor 46 may be a microprocessor, controller, or any other suitable computing device or resource. Memory module 50 may be any form of volatile or non-volatile memory including, without limitation, magnetic media, optical media, random access memory (RAM), read-only memory (ROM), removable media, or any other suitable local or remote memory component. Observer 49 may be any combination of hardware, software and/or encoded logic, and is used to monitor the "state" of each agent (e.g., logged in, available, unavailable, etc.). It will be recognized by those of ordinary skill in the art that ACD 34a may include any number of processors or memory modules to accomplish the functionality and features described herein. The processors 46, memory modules 50, and/or observer 49 associated with ACD 34a may be centrally located (local) with respect to one another, or distributed throughout communication network 36a.

If a suitable agent is available to receive the incoming call, a distributor 52 of ACD 34a connects the call with an agent having an appropriate skill(s) to address the call(er). If an agent is not available, the call may be placed into a queue 54 in order to wait for an appropriate agent(s). While a caller is waiting for an agent, ACD 34a may perform one or more of several functions including data collection from the user, playing of pre-recorded messages, or other automated process. As soon as the agent with the appropriate skill becomes available, distributor 52 connects the call with the appropriate agent.

In a particular embodiment of the present invention, ACD 34a is configured to accomplish skills-based routing, which refers to routing incoming calls based on the type of service requested. This assures that calls go to agents with the skills to provide the highest quality of service to the calling customer. In other words, someone calling about automobile insurance should be directed to an agent competent to address automobile insurance questions, and not an agent trained in life insurance. Skills-based routing takes advantage of the routing capabilities of ACD 34a, in consideration of the unique skills of individual agents or agent groups and the requirements or preferences of individual callers. In this manner, customers who prefer to conduct business in a particular language, for example Spanish, can be directed to an agent skilled in a particular field (e.g., life insurance), and/or fluent in Spanish. The routing process may be accomplished on the basis of a client profile stored in a database on an adjunct computer system linked to ACD 34a, or on memory module 50 or based on information collected via an interactive voice response (IVR) unit. Prior to connecting the call, the database would be queried, with the query process being initiated on the basis of the caller's touch-tone entry of an account number, identification number, preference, or on the basis of caller ID (for routing based on geography).

In the illustrated embodiment of FIG. 2, agent 48a is fluent in English and German languages. Agent 48b is fluent in German and French. Agent 48c is fluent in English and Spanish, and agent 48d is fluent in English and French. Therefore, if a caller prefers to conduct business in English, the call may be routed to any one of agents 48a, 48c, and 48d. The preference of the caller may be determined using: (i) caller ID in order to determine the source of the incoming call, (ii) by selection of the caller using touch-tone prompts or other data entry techniques, (iii) according to a user profile stored within a memory module coupled with ACD 34a, or (iv) according to an identification number associated with the caller.

It should be noted that with regard to agents 48a–48d, three agents are fluent in English, two agents are fluent in German, and two agents are fluent in French. However, only one agent is fluent in Spanish. Therefore Spanish is a "generally unique" skill amongst agents 48a–48d. For this reason, ACD 34a will attempt to maintain the availability of agent 48c in case a request for a Spanish-speaking agent is received.

In other words, if a caller requests an English-speaking agent, and all of agents 48a–48d are available, ACD 34a would attempt to distribute this call to agent 48a or 48d, in order to maintain the availability of Spanish-speaking agent 48c. This type of routing may mean that agents 48a and 48d will each handle a higher call volume than agent 48c, but overall the system will provide better service to callers, since more skills will be available at any given time. If the call is routed to agent 48a, there are still English-speaking agents available (48c, 48d), and a German-speaking agent available (48b) for the next such request(s).

In this manner, processor 46 and ACD 34a will often perform a statistical analysis in order to determine the most appropriate agent to connect with an incoming caller, in order to increase the probability that subsequent callers requesting specific skills will find an agent having that skill, that is generally available. In other embodiments, each agent 48a–48d may have an entire resume of particular skills available. Such skills may include business types (sales department vs. service department, or life insurance vs. automobile insurance vs. health insurance, etc.) which the particular agent is trained in responding to, languages spoken by the agent (English, Spanish, French, German, etc.), or other expertise. The statistical analysis may take into account the entire skill set of each agent in determining a "preferred" agent, or "appropriate" agent to connect with the call. Business type may also refer to a particular knowledge base of an agent(s) (e.g., competence in a particular subject(s)).

Under certain circumstances incoming calls to ACD 34a are re-routed to another of ACDs 34b–34d. For example, ACD 34a may be experiencing high traffic and queue 54 may be at or near an acceptable capacity. Similarly, communication to ACD 34a may be disrupted and another component of network 36a, for example node 41 may redirect incoming calls bound for ACD 34a to another ACD. The teachings of the present invention provide a system and method which selects a particular ACD and/or a particular agent associated with a particular ACD, to receive an incoming call requesting a particular skill.

The ACD and the agent selected to receive a particular call is based upon the particular skills possessed by each agent, as described above with regard to ACD 34a. Furthermore, the amount of bandwidth available to the selected ACD is also taken into account in determining where to route the incoming call. For example, and with reference to FIG. 1, there is a limited amount of bandwidth available from endpoint 32a to any one of ACDs 34b–34d. If an agent having a particularly unique skill is located at ACD 34c, then the system may elect to route calls elsewhere in order to preserve bandwidth between network 36a and ACD 34c. By way of example, if ACD 34c included ten English-speaking agents and one Spanish-speaking agent, and Spanish was a generally unique skill for an agent, the system would route requests for English-speaking agents to ACDs other than 34c. Otherwise, if ten calls were sent to English-only speaking agents at ACD 34c, those communication sessions may occupy most or all of the bandwidth available to ACD 34c over link 37a and prevent a future user from gaining access to the Spanish-speaking agent at ACD 34c. If the call were simply routed to the ACD with the most English speaking agents, then access to the Spanish speaking agent may be blocked to future callers. This selections process will be discussed in more detail with regard to FIG. 3.

FIG. 3 illustrates a method for routing calls of an automatic call distributor system, in accordance with a particular embodiment of the present invention. The method begins at step 100 where a request for connection with an agent is received at a network component. For example the request may be received from a user of endpoint 32a. The network component receiving the request may be an ACD, for example ACD 34a, or other network component operable to receive and distribute requests. In a particular embodiment, node 41 may be configured to redirect calls directed to ACD 34a, if communication with ACD 34a is down, ACD 34a is operating above a predetermined capacity, or the agent's skills available at ACD 34a are limited with respect to other ACDs.

At step 102 agents having an appropriate skill to address the caller are identified. The appropriate skill required to address the caller may be determined through a variety of methods. In a particular embodiment, the agent having the appropriate skill may be based upon the identity of the caller or the geographic location of the caller. In another embodiment, a network component may prompt the user to identify the business type, language or other preference of the user. In other embodiments, the user may be prompted to enter a user identification, account number, or other appropriate identifier. This information may be used to determine the appropriate agent and/or the appropriate skill required to address the call using a database or other lookup technique, for example memory module 50. In still another embodiment, an interactive voice response (IVR) system may be incorporated into ACD 34a, or another network component of system 30, which provides the user with a menu of selections for choosing an agent and/or a skill. Using some or all of the information described above, appropriate ACDs and/or agents capable of fielding the incoming call(s) may be selected.

At step 104, communication paths to the ACDs and/or agents are identified. One or more agents having the appropriate skill may be distributed amongst one or more ACDs. Therefore, communication paths to such agents may differ in the amount of network resources available along such communication paths. At step 106, the system collects information regarding the communication paths. In one embodiment, this information can be obtained from call admission control (CAC) system 45. The information collected may include the amount of bandwidth available along the communication path to the ACDs, or agents having the appropriate skill. In accordance with another embodiment, the information may include voice quality available along the communication paths. Voice quality may be determined, at least in part, based upon a measurement of network parameters such as packet delay, jitter, or echo, along the communication paths.

In a particular embodiment, the information about the communication paths (e.g., network information) may be collected by a CAC system 45, coupled for communication with network 36a. The resource manager may be a node of network 36a located anywhere within network 36a, or distributed throughout. The CAC system may include any number and/or configuration of processors and/or memory modules.

The information about the communication paths may be collected from a call admission control (CAC) coupled with one or more of networks 36a–36c. For example, an interface may be established between the WAN 37b, CAC 45 and the processor performing skill-based agent selection. The resource manager utilizes this interface to obtain information regarding the available bandwidth between the caller, and various available ACDs.

At step 108, one or more generally unique skills are identified. Unique skills refer to skills which are in relatively high demand and/or skills that are relatively scarce amongst agents (or available agents). In general, a unique skill(s) refers to any skill for which, it is more desirable to protect access to with respect to other skills, for future incoming callers. In some cases, this is true because it is likely that only a limited number of agents having such unique skill(s) will be available to a future caller requesting the generally unique skill(s).

At step 110, the information collected at steps 102 through 108 is used to identify a preferred communication path, ACD, and/or agent having the appropriate skill, to receive the incoming call. The selection of the preferred communication path, preferred ACD and/or preferred agent may be based upon a statistical analysis which increases the probability that agents possessing generally unique skills will be available for potential future incoming requests from callers. Therefore, if two agents possess an appropriate skill to address an incoming call, and one of the two agents also possesses a generally unique skill, the agent that does not have the generally unique skill will be favored in the selection process. If there is a limited amount of bandwidth available to the ACD associated with the agent having the generally unique skill, this selection process will favor connecting the call to a different ACD (having relatively more available bandwidth) which has an agent having the appropriate skill to address the caller.

At step 112 the user, or caller is connected with an agent having the appropriate skill using the preferred communication path or preferred ACD. Therefore, the caller is connected with an agent in a manner which attains a higher probability that the generally unique skill(s) will remain available for receiving a future request for the generally unique skill, taking into account both the network resources available for connection to one or more agents, and the skills sets associated with each agent. For the purpose of this specification, the "preferred" agent, ACD and/or communication path refers to the agent, ACD or communication path which is selected to achieve a relatively high probability that agents having generally unique skills will be available without an unnecessary waiting time, to future users.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for routing calls of an automatic call distributor system, comprising:
   receiving, from a user, a request for connection with one of a plurality of agents having one of a plurality of skills;
   identifying at least first and second agents of the plurality of agents, the first and second agents each having at least the one of the plurality of skills;
   the first and second agents being available for connection with the user along first and second communication paths, respectively;
   receiving a measurement of at least one network parameter regarding each of the first and second communication paths;
   identifying a generally unique skill of the plurality of skills; and
   routing the request along a preferred communication path of the first and second communication paths based upon the availability of the first and second agents and the measurement of the at least one network parameter, the preferred communication path being selected to attain a higher probability that the generally unique skill will remain available for receiving a future request for connection.

2. The method of claim 1, wherein the measurement of the at least one network parameter regarding each of the first and second communication paths, respectively, comprises first and second quantities of bandwidth available along the first and second communication paths, respectively.

3. The method of claim 1, wherein the plurality of skills comprise a plurality of languages spoken by one or more of the plurality of agents.

4. The method of claim 1, wherein the plurality of skills comprise a plurality of business types addressed by one or more of the plurality of agents.

5. The method of claim 1, wherein the first agent is geographically remote from the second agent, and a third agent having the generally unique skill is co-located with one of the first and second agents.

6. The method of claim 1, wherein the network information measurement of the at least one network parameter regarding each of the first and second communication paths, respectively, includes network parameters associated with the first and second communication paths, respectively, the network parameters being selected from the group consisting of delay, jitter, and echo.

7. A method for handling calls of an automatic call distributor system, comprising:
   receiving, from a user, a request for connection with one or a plurality of agents, having one of a plurality of skills;
   connecting the user with a preferred agent of the plurality of agents, the preferred agent having the one of the plurality of skills; and
   wherein the preferred agent is selected according to a statistical analysis using variables including a measurement of at least one network parameter regarding a communication path between the user and the preferred agent, and an impact of connecting the user with the preferred agent upon the availability of a generally unique skill of the plurality of skills, to a future user.

8. The method of claim 7, wherein the network parameter comprises bandwidth.

9. The method of claim 7, wherein the network parameter comprises voice quality.

10. The method of claim 8, wherein the statistical analysis further includes voice quality available along the communication path.

11. An automatic call distributor system, comprising:
   at least one input port operable to receive, from a user, a request for connection with one of a plurality of agents having one of a plurality of skills;
   a processor being operable to identify at least first and second agents of the plurality of agents, the first and second agents each having at least the one of the plurality of skills;
   the first and second agents being available with the user for connection along first and second communication paths, respectively;
   the processor being further operable to receive a measurement of at least one network parameter regarding each of the first and second communication paths, and identify a generally unique skill of the plurality of skills; and
   the processor being further operable to select a preferred communication path of the first and second communication paths based upon the availability of the first and second agents and the measurement of the at least one network parameter, for routing the request, the preferred communication path being selected to attain a higher probability that the generally unique skill will remain available to future users.

12. The system of claim 11, wherein the measurement of the at least one network parameter regarding each of the first and second paths, respectively, comprises first and second quantities of bandwidth available along the first and second communication paths, respectively.

13. The system of claim 11, wherein the plurality of skills comprise a plurality of languages spoken by one or more of the plurality of agents.

14. The system of claim 11, wherein the plurality of skills comprise a plurality of business types addressed by one or more of the plurality of agents.

15. The system of claim 11, wherein the first agent is geographically remote from the second agent, and a third agent having the generally unique skill is co-located with one of the first and second agents.

16. The system of claim 11, wherein the measurement of the at least one network parameter regarding each of the first and second network communication paths, respectively, includes network parameters associated with the first and second communication paths, respectively, the network parameters being selected from the group consisting of delay, jitter, and echo.

17. An automatic call distributor system, comprising:
  at least one input port being operable to receive, from a user, a request for connection with one of a plurality of agents having one of a plurality of skills;
  a processor being operable to identify a preferred agent of the plurality of agents, the preferred agent having the one of the plurality of skills; and
  wherein the processor is operable to select the preferred agent by a statistical analysis using a plurality of variable values including a measurement of at least one network parameter regarding a communication path between the user and the preferred agent, and an impact of connecting the user with the preferred agent upon the availability of a generally unique skill of the plurality of skills, to a future user.

18. The system of claim 17, wherein the network parameter comprises bandwidth.

19. The system of claim 17, wherein the network parameter comprises voice quality.

20. The system of claim 18, wherein the statistical analysis further includes voice quality available along the communication path.

21. The system of claim 20, wherein voice quality is determined using one of a plurality of parameters including jitter, delay, and echo.

22. Logic encoded in media for routing calls of an automatic call distributor system, the logic operable to perform the following steps:
  receive, from a user, a request for a connection with one of a plurality of agents having one of a plurality of skills;
  identify at least first and second agents of the plurality of agents, the first and second agents each having at least the one of the plurality of skills;
  the first and second agents being available to receive the request for connection along first and second communication paths, respectively;
  receive a measurement of at least one network parameter regarding each of the first and second communication paths;
  identify a generally unique skill of the plurality of skills; and
  route the request along a preferred communication path of the first and second communication paths based upon the availability of the first and second agents and the measurement of the at least one network parameter, the preferred communication path being selected to attain a higher probability that the generally unique skill will remain available for receiving a future request for connection.

23. The logic encoded in media of claim 22, wherein the measurement of the at least one network parameter regarding each of the first and second communication paths, respectively, comprises first and second quantities of bandwidth available along the first and second communication paths, respectively.

24. The logic encoded in media of claim 22, wherein the plurality of skills comprise a plurality of languages spoken by one or more of the plurality of agents.

25. The logic encoded in media of claim 22, wherein the plurality of skills comprise a plurality of business types addressed by one or more of the plurality of agents.

26. The logic encoded in media of claim 22, wherein the first agent is geographically remote from the second agent, and a third agent having the generally unique skill is co-located with one of the first and second agents.

27. The logic encoded in media of claim 22, wherein the measurement of the at least one network parameter regarding each of the first and second communication paths, respectively, includes network parameters associated with the first and second communication paths, respectively, the network parameters being selected from the group consisting of delay, jitter, and echo.

28. Logic encoded in media for handling calls of an automatic call distributor system, the logic operable to perform the following steps:
  receive, from a user, a request for connection with one of a plurality of agents, having one of a plurality of skills;
  select a preferred agent of the plurality of agents by a statistical analysis using variables including a measurement of at least one network parameter regarding a communication path between the user and the preferred agent, and an impact of connecting the user with the preferred agent upon the availability of a generally unique skill of the plurality of skills to a future user; and
  connect the user with the preferred agent, the preferred agent having the one of the plurality of skills.

29. The logic encoded in media of claim 28, wherein the network parameter comprises bandwidth.

30. The logic encoded in media of claim 28, wherein the network parameter comprises voice quality.

31. The logic encoded in media of claim 29, wherein the statistical analysis further includes voice quality available along the communication path.

32. An apparatus for routing calls of an automatic call distributor system, comprising:
  means for receiving, from a user, a request for connection with one of a plurality of agents having one of a plurality of skills;
  means for identifying at least first and second agents of the plurality of agents, the first and second agents each having at least one of the plurality of skills;
  the first and second agents being available to receive the request for connection along first and second communication paths, respectively;
  means for receiving a measurement of at least one network parameter regarding each of the first and second communication paths;
  means for identifying a generally unique skill of the plurality of skills; and
  means for routing the request along a preferred communication path of the first and second communication paths based upon the availability of the first and second agents and the measurement of the at least one network parameter, the preferred communication path being selected to attain a higher probability that the generally unique skill will remain available for receiving a future request for connection.

33. The apparatus of claim 32, wherein the measurement of the at least one network parameter regarding each of the first and second communication paths, respectively, comprises first and second quantities of bandwidth available along the first and second communication paths, respectively.

34. The apparatus of claim 32, wherein the plurality of skills comprise a plurality of languages spoken by one or more of the plurality of agents.

35. The apparatus of claim 32, wherein the plurality of skills comprise a plurality of business types addressed by one or more of the plurality of agents.

36. The apparatus of claim 32, wherein the first agent is geographically remote from the second agent, and a third agent having the generally unique skill is co-located with one of the first and second agents.

37. The apparatus of claim 32, wherein the measurement of the at least one network parameter regarding each of the first and second communication paths, respectively, includes network parameters associated with the first and second communication paths, respectively, the network parameters being selected from the group consisting of delay, jitter, and echo.

38. An apparatus for handling calls of an automatic call distributor system, comprising:

means for receiving, from a user, a request for a connection with one of a plurality of agents having one of a plurality of skills;

means for selecting a preferred agent of the plurality of agents by a statistical analysis using variables including a measurement of at least one network parameter regarding a communication path between the user and the preferred agent, and an impact of connecting the user with the preferred agent upon the availability of a generally unique skill of the plurality of skills, to a future user; and means for connecting the user with the preferred agent, the preferred agent having the one of the plurality of skills.

39. The apparatus of claim 38, wherein the network parameter comprises bandwidth.

40. The apparatus of claim 38, wherein the network parameter comprises voice quality.

41. The apparatus of claim 39, wherein the statistical analysis further includes voice quality available along the communication path.

\* \* \* \* \*